(12) United States Patent
Martinsen (10) Patent No.: US 7,950,014 B2
(45) Date of Patent: May 24, 2011

(54) DETECTING THE READY STATE OF A USER INTERFACE ELEMENT

(75) Inventor: Ronald R. Martinsen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 11/756,755

(22) Filed: Jun. 1, 2007

(65) Prior Publication Data

US 2008/0301714 A1    Dec. 4, 2008

(51) Int. Cl.
G06F 9/46 (2006.01)
G06F 3/00 (2006.01)
G06F 12/00 (2006.01)
G06F 12/14 (2006.01)
G06F 13/00 (2006.01)

(52) U.S. Cl. ........ 718/104; 715/700; 710/200; 710/220; 710/240; 710/241; 710/242; 710/243; 710/244; 711/100; 711/150

(58) Field of Classification Search .................. None
See application file for complete search history.

(56) References Cited

U.S. PATENT DOCUMENTS

| | | | |
|---|---|---|---|
| 4,494,188 A | | 1/1985 | Nakane et al. |
| 5,465,335 A | | 11/1995 | Anderson |
| 5,592,673 A | * | 1/1997 | Kurabayashi et al. ........ 710/200 |
| 6,105,057 A | * | 8/2000 | Kuftedjian et al. ........... 709/213 |
| 6,260,058 B1 | | 7/2001 | Hoenninger et al. |
| 6,959,365 B2 | | 10/2005 | Ootani et al. |
| 7,032,226 B1 | | 4/2006 | Nemirovsky et al. |
| 7,117,496 B1 | | 10/2006 | Ramesh et al. |
| 2005/0088410 A1 | | 4/2005 | Chaudhri |
| 2005/0149627 A1 | * | 7/2005 | Schreter ........................ 709/223 |
| 2006/0136915 A1 | | 6/2006 | Aingaran et al. |
| 2006/0150004 A1 | | 7/2006 | Mizutani |
| 2006/0242278 A1 | | 10/2006 | Hawkins |

OTHER PUBLICATIONS

Suranauwarat et al., "A Disk Scheduling Mechanism for a WWW Server", Aug. 6-12, 2001, pp. 1-7.
"Thread Scheduling", available at least as early as Mar. 23, 2007, retrieved at http://book.itzero.com/read/microsoft/0507/Microsoft.Press.Microsoft.Windows.Internals.Fourth.Edition.Dec.2004.internal.Fixed.eBook-DDU_html/0735619174/ch06lev1sec5, pp. 1-43.
Banga et al., "A Scalable and Explicit Event Delivery Mechanism for UNIX", USENIX Annual Technical Conference, Jun. 1999, pp. 1-14.

* cited by examiner

Primary Examiner — Qing Wu (57) ABSTRACT

Aspects of the subject matter described herein relate to detecting the ready state of a user interface element. In aspects, a synchronization object is created to indicate when a user interface element is ready. Data is then loaded into the user interface element. After the data is loaded, an indication is made via the synchronization object that the user interface element is ready. After this occurs, a thread waiting on the synchronization object may interact with the user interface element with confidence that the user interface element is ready.

20 Claims, 5 Drawing Sheets

DETECTING THE READY STATE OF A USER INTERFACE ELEMENT

BACKGROUND

A user interface element may use a background thread to perform costly load operations so that the primary window thread is not blocked and can still process paint events to avoid the appearance of being hung or non-responsive. For example, in a user interface that has multiple pages, some of the pages may need to be populated with information from an external database or some other source. The user interface may spawn background threads to load information in these pages to maintain responsiveness. A program (e.g., a test script or other process) that interacts with the user interface may have no way of knowing when a page has finished loading its data. This may cause the program to fail or report erroneous results.

SUMMARY

Briefly, aspects of the subject matter described herein relate to detecting the ready state of a user interface element. In aspects, a synchronization object is created to indicate when a user interface element is ready. Data is then loaded into the user interface element. After the data is loaded, an indication is made via the synchronization object that the user interface element is ready. After this occurs, a thread waiting on the synchronization object may interact with the user interface element with confidence that the user interface element is ready.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
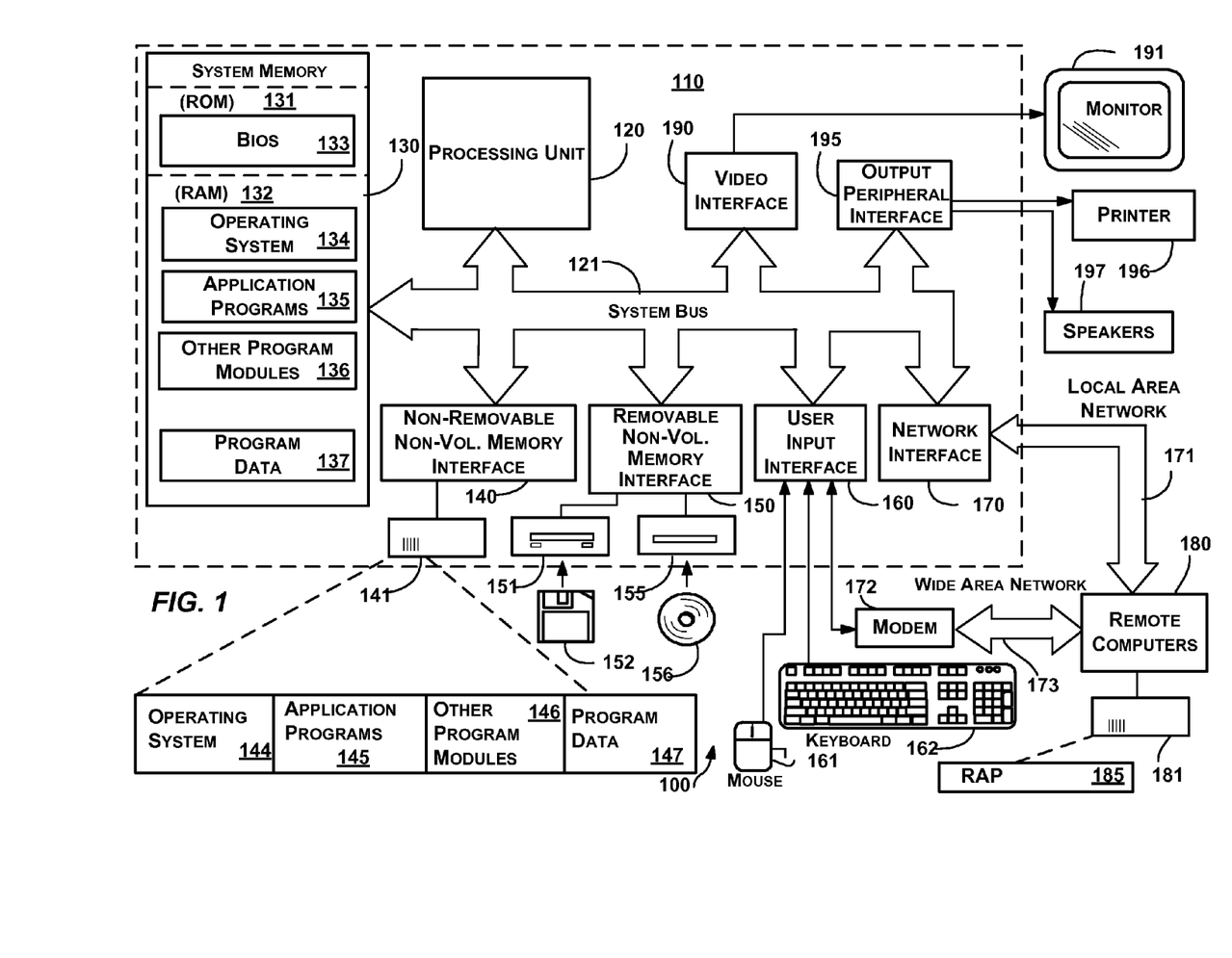
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad.

Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Detecting Ready State

As mentioned previously, a program such as a test script or other process may desire to know when a user interface element has completed loading one or more items of data. In one example, the program may attempt to do this by calling a function that returns whether the element is waiting for user input with no input currently pending.

In another example, a developer that writes or can modify the user interface element as well as the program seeking to interact with the user interface element, may attempt to do this by having the user interface element write one or more files when it has completed one or more load operations. When the file is found by the other program, the other program can assume that the user interface element (or a page or portion thereof) is done loading its data.

In both of the examples above, the program seeking to know the state of the user interface element may operate in a polling loop, checking to see whether the user interface element is done loading its data. After performing a check that indicates that the user interface element has not completed loading yet, the program may sleep for a period of time and then try again.

As will be appreciated by those skilled in the art, both of the examples above may involve considerable overhead in looping to check for the readiness of the user interface element.

Furthermore, it may be the case that the check returns a false result (e.g., the check indicates that the page has been loaded with the data, but the page has not completed loading).

Figure 2:
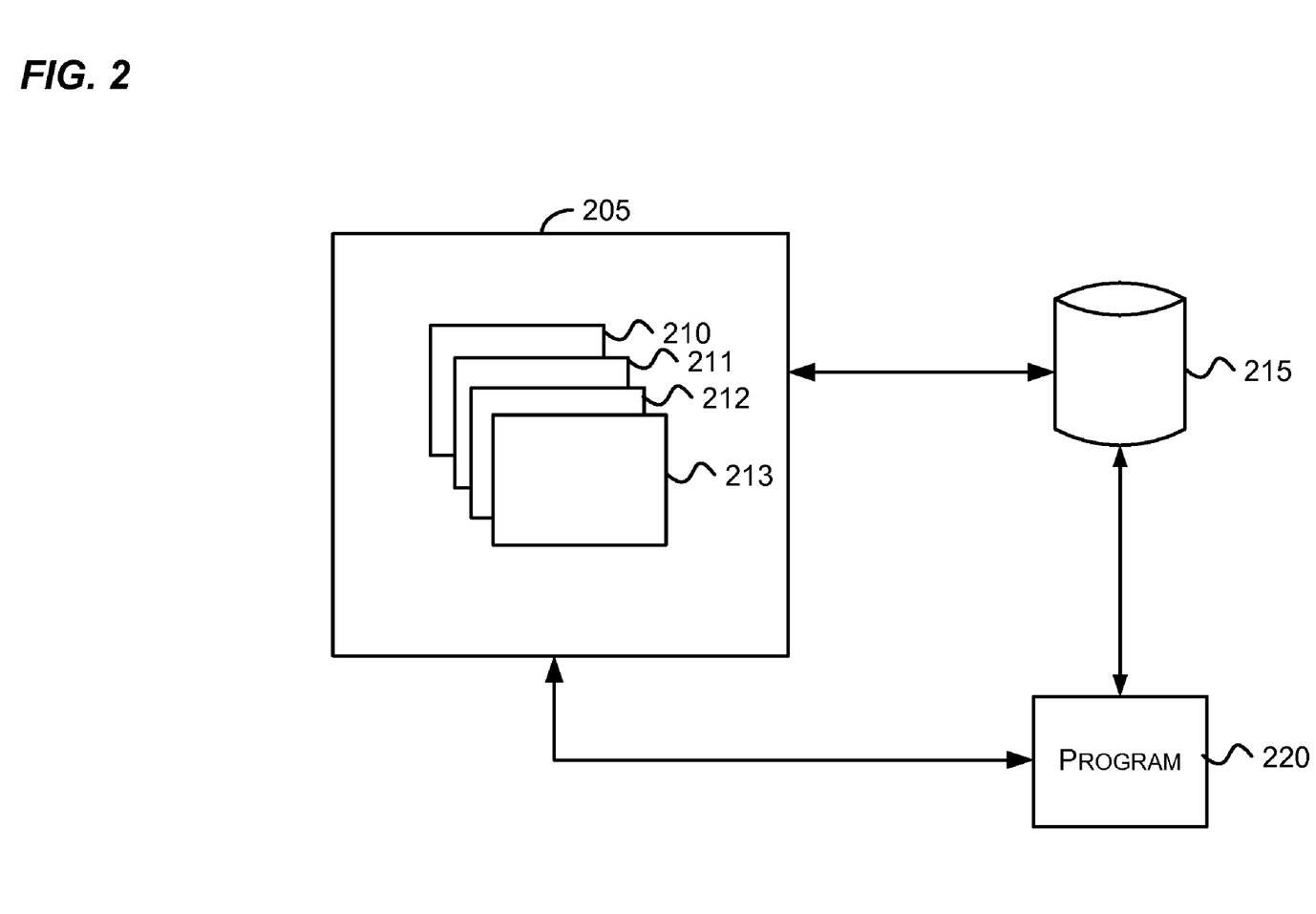
FIG. 2 is a block diagram that generally represents a user interface and a program that seeks to determine the state of an element within the user interface in accordance with aspects of the subject matter described herein.

FIG. 2 is a block diagram that generally represents a user interface and a program that seeks to determine the state of an element within the user interface in accordance with aspects of the subject matter described herein. As illustrated, the user interface 205 may include one or more elements (e.g., elements 210-213).

The user interface elements 210-213 may include one or more controls. For example, a user interface may include text boxes, grid controls, tool bars, list box items, combo boxes, buttons, panels, menus, sub menus, page controls, and many other controls as will be readily recognized by those skilled in the art. These controls may be used to enter, load, display, and/or modify data associated with a program. For example, an installation wizard may collect data in various data input screens. The wizard may then use this data to install or configure software package, for example. As another example, a user management application may include controls that load user information from a directory service or database, for example.

The program 220 may be interested in when one or more of the elements 210-213 have completed loading data and are ready to receive input. For example, the program 220 may comprise a test application that is designed to test various features regarding the user interface 205. The program 220 may be able to send commands to the user interface 205 to navigate via the elements 210-213. Before a command is sent to a particular element, the program 220 may wish to know that the element has loaded any of its related data and is ready to receive input.

As another example, the program 220 may comprise a part of program providing the user interface 205. For example, if a tab wanted to activate another tab and perform some action when the newly activated tab had completed some processing, aspects of the subject matter described herein could be used. As another example, a page control could grey-out or otherwise disable a list box or other control until the list box or other control was fully populated.

In one embodiment, an operating system mechanism such as a synchronization object may be used to indicate when an element is ready to receive input. A synchronization object is an object that can be waited upon by one or more processes and/or threads. When a process or thread (hereinafter sometimes referred to as "thread") is waiting on a synchronization object, the thread may be suspended and not executed by the operating system until the thread is awakened. The thread may be awakened when the synchronization object changes states (e.g., is signaled). Some exemplary thread synchronization objects include an event, a mutex, a semaphore, and the like.

To operate with a synchronization object, a user interface element or another program may first check to see if the synchronization object has been created. For example, if the program 220 is testing the user interface 205, the program 220 may cause the program that creates the user interface 205 to be executed.

Then, the program 220 may attempt to open a synchronization object via a unique identifier known to the user interface element and the program 220. If the attempt to open the synchronization object fails, the program 220 may create the synchronization object and request that the operating system notify the program 220 when the synchronization object is signaled. If the request to open the synchronization object succeeds, the program may simply request that the operating system notify the program 220 when the synchronization object is signaled.

When it is executed, the user interface 205 may create various user interface elements (e.g., elements 210-213). Each element may, upon creation, attempt to open a corresponding synchronization object via an identifier associated with the element and known to the program 220. If the synchronization object already exists (e.g., the program 220 has already created it), the element may obtain a handle (e.g., pointer) to the synchronization object. If the synchronization object does not already exist (e.g., the element executed before the program 220 was able to create the synchronization object), the element may create the synchronization object using the identifier and may receive a handle thereto.

After the element finishing loading its data or is otherwise prepared to receive input, the element may then signal the synchronization object. This causes the operating system to awaken any threads that have been waiting for the synchronization object to become signaled. The program 220 may include one or more of these threads. When a thread is awakened by the operating system, the thread may then know that the user interface element it is waiting for has completed any operations the user interface element needs to be prepared to receive input. At this point, the thread may send a message (e.g., select a particular item in a list box) to the user interface element without being concerned that the user interface element will not respond or will not have the appropriate data loaded.

The synchronization object name store 215 may include a portion of the identifiers associated with user interface elements. For example, the store 215 may include the name of each of the elements. To uniquely identify a synchronization object for a particular element, the identifier may be combined with a process identifier, for example, that identifies the user interface 205. The program 220 and any element may obtain this process identifier via an operating system call, for example. In this manner, both the program 220 and each user interface element may know what synchronization object to open or create to communicate between each other.

In some embodiments, a system may allow only one instance of a particular user interface. In such embodiments, there may be no need to combine the user interface element identifier with the process identifier as the user interface element identifier itself may be sufficient to uniquely identify the synchronization object.

The identifiers in the store 215 may be created as part of a development environment used to create the user interface. For example, when a user specifies or updates the name of a user interface element via a screen of the development environment, the development environment may store this name in the store 215. The store 215 may be associated with the user interface 205 in such a way that it is passed with the code associated with the user interface 205. For example, the store may be encoded in the code which implements the user interface 205. In another example, the store may be encoded in metadata associated with the code that implements the user interface 205. In yet another example, shared code that accesses the event may be compiled or linked into the code that implements the user interface 205 and the code that seeks to synchronize with the user interface 205. By using one of the mechanisms above, the discovery of synchronization objects by the program 220 may be accomplished with little or no manual maintenance of identifiers of the synchronization objects.

Figure 3:
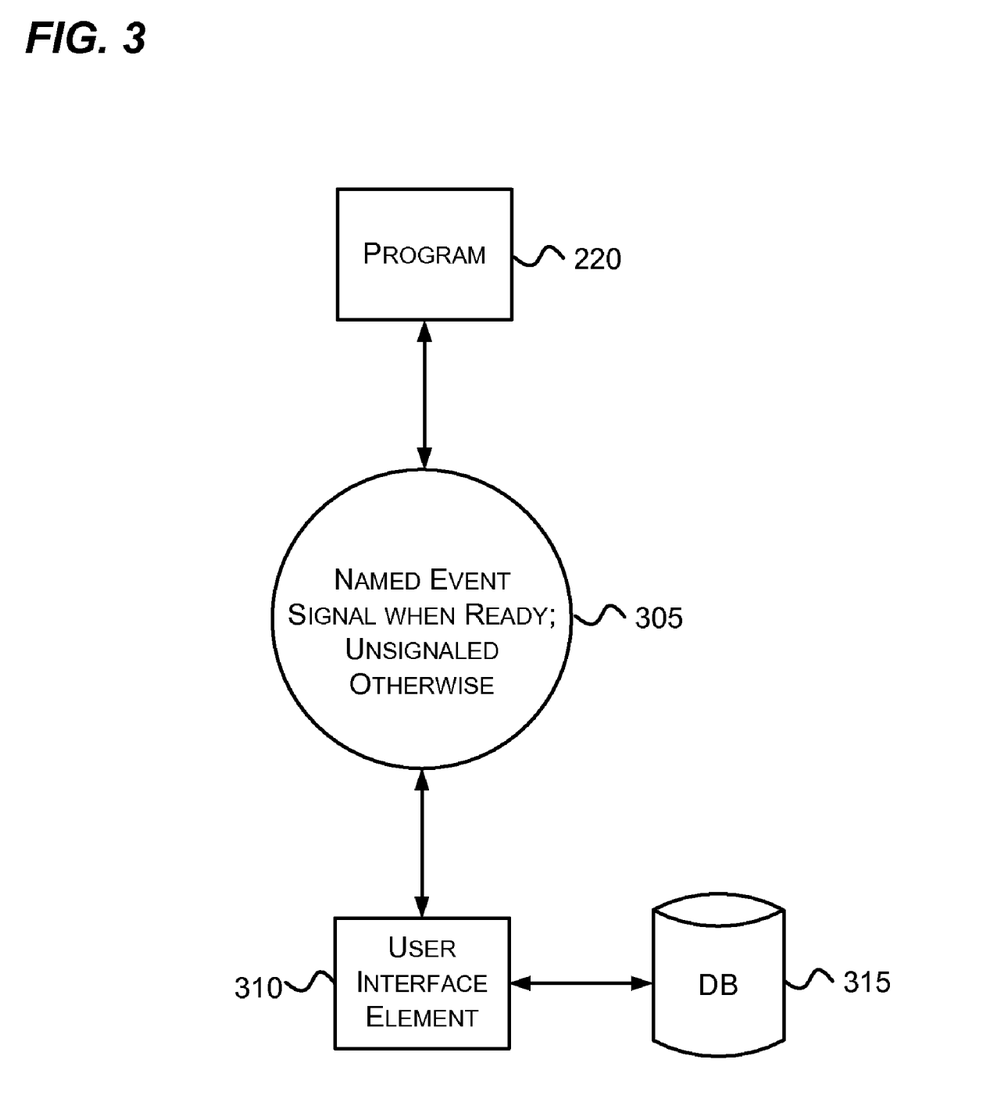
FIG. 3 is a block diagram that generally represents a user interface element and a program that seeks to determine the state of the element via a named event synchronization object in accordance with aspects of the subject matter described herein.

FIG. 3 is a block diagram that generally represents a user interface element and a program that seeks to determine the state of the element via a named event synchronization object in accordance with aspects of the subject matter described herein. As shown, FIG. 3 includes the program 220, a named event 305, a user interface element 310, and a database 315.

As mentioned previously, the program 220 may execute or locate a running instance of a program (hereinafter referred to as the "UI program") that generates the user interface element 310. The user interface element 310 (e.g., a page of a Wizard) may first try to open a named event synchronization object using a name that is known between the program 220 and the user interface element 310. If the named event does not exist, the user interface element 310 creates it. When the event is created, the event is created with the ready state marked as unsignaled (e.g., not ready or false). The user interface element 310 may then create a background worker thread to call a database (e.g., a directory service) to get a list of users in a domain, for example. While this thread runs, data may populated into a control (e.g., a list box) of the user interface element 310. As long as the named event is unsignaled, the program 220 may know that the user interface element 310 is not ready yet. Once the background worker thread reaches its last line of code, the thread signals (e.g., sets to true) the named event to let any event listeners know that the user interface element 310 is now in the ready state.

In this same example described above, the program 220 may begin by attempting to open the named event synchronization object. If the program 220 can not open the named event synchronization object (e.g., it does not exist), the program 220 may create the named event synchronization object. The program 220 may not be able to open the named event synchronization object, for example, if the program 220 started before the user interface element 310 was instantiated.

The program 220 may then wait for the named event synchronization object to be signaled (e.g., via a WaitForSingleObjectEx on that named event synchronization object) and be suspended until the event is signaled. After the named event synchronization object is signaled, the program may then use the user interface element 310 with full confidence that the user interface element 310 is ready to receive input.

Figure 4:
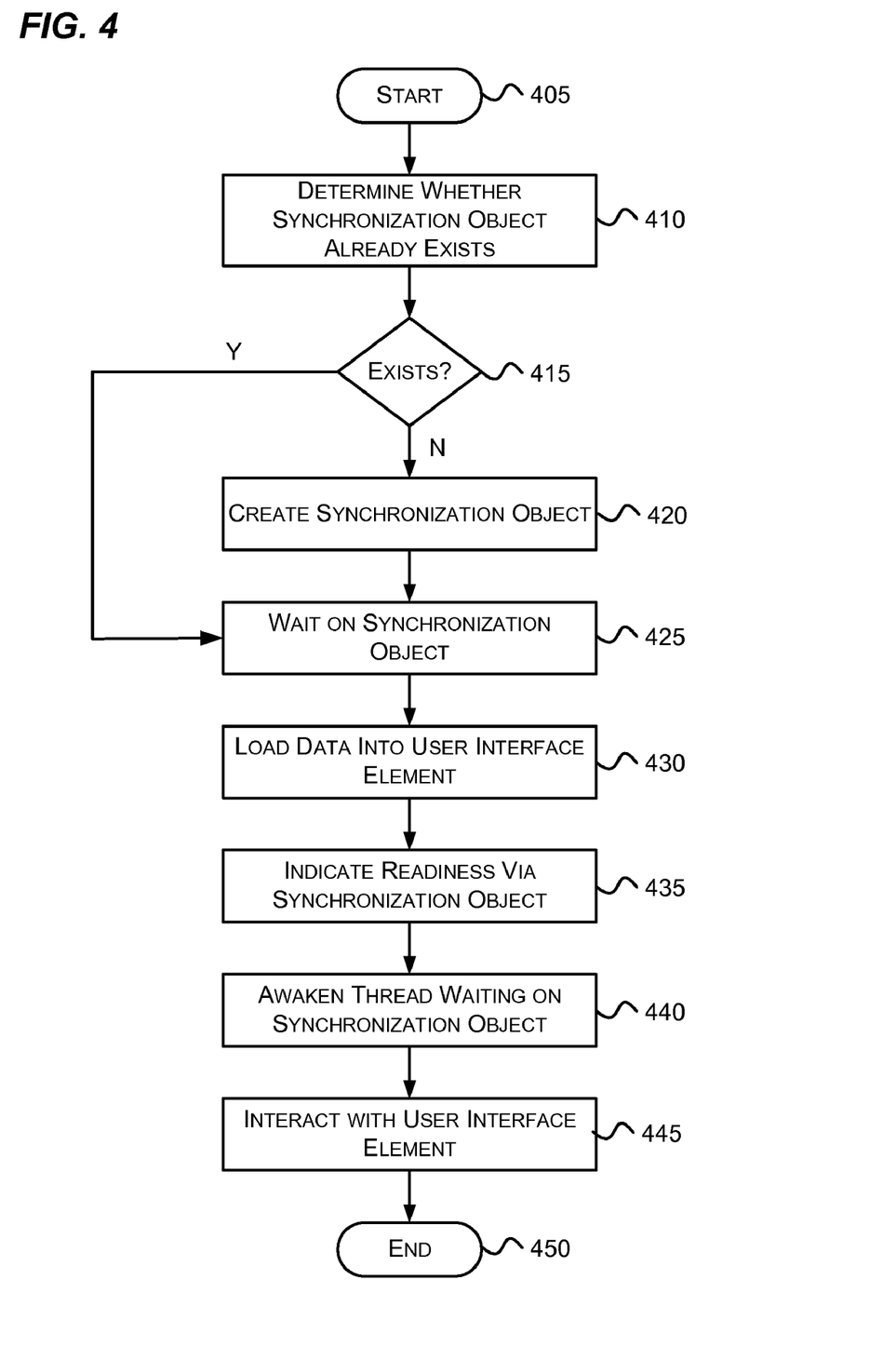
FIGS. 4-5 are flow diagrams that generally represent exemplary actions that may occur in accordance with aspects of the subject matter described herein.
Figure 5:
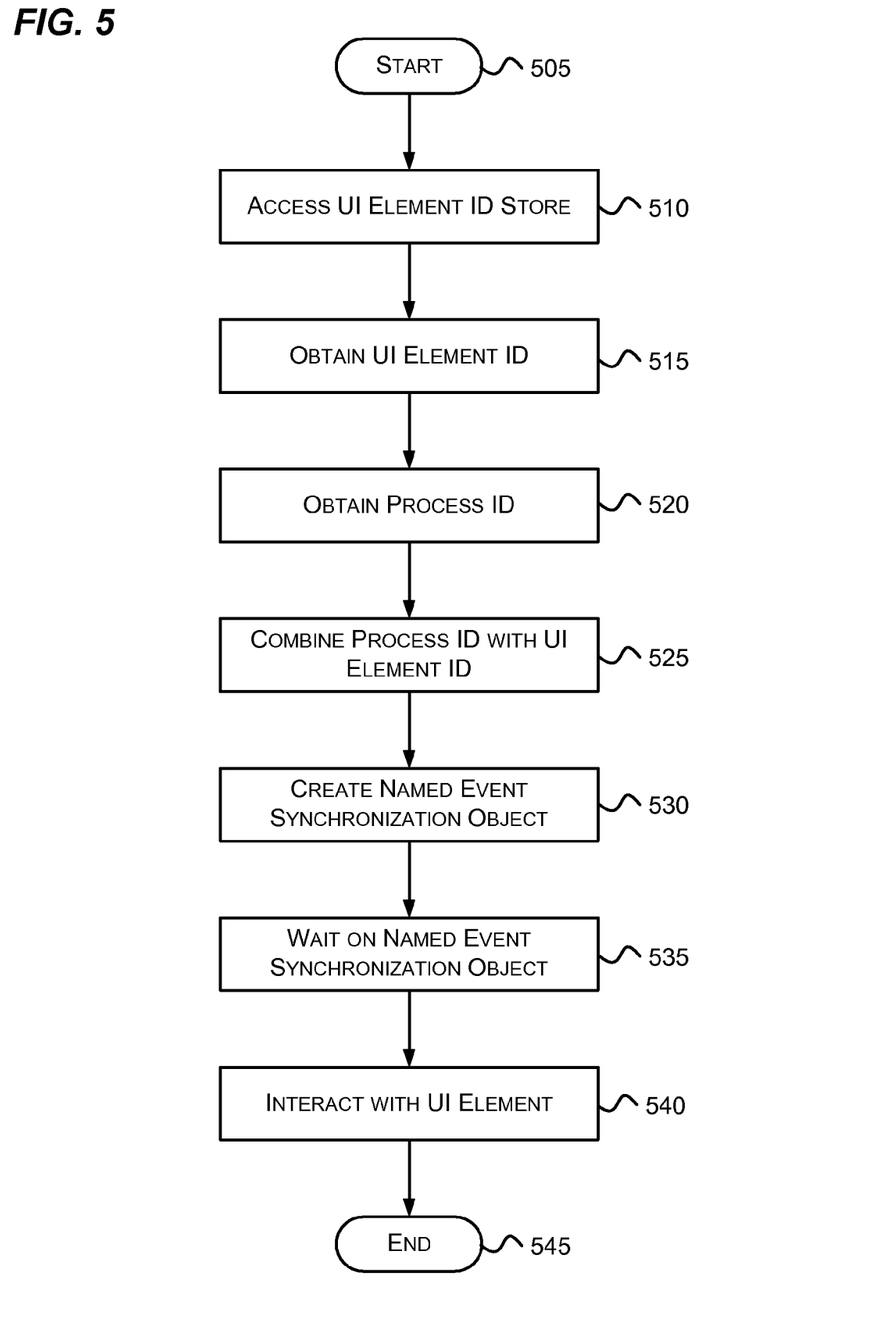

FIGS. 4-5 are flow diagrams that generally represent exemplary actions that may occur in accordance with aspects of the subject matter described herein. For simplicity of explanation, the methods described in conjunction with FIGS. 4 and 5 are depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methods in accordance with aspects of the subject matter described herein. In addition, those skilled in the art will understand and appreciate that the methods could alternatively be represented as a series of interrelated states via a state diagram or as events.

Turning to FIG. 4, at block 405, the actions begin. At block 410, a determination is made as to whether a synchronization object already exists. For example, referring to FIG. 2, the user interface element 213 may attempt to open a synchronization object using an identifier unique to the user interface element 213. Alternatively, the program 220 may attempt to open the synchronization object using the identifier.

At block 415, if the synchronization object exists, the actions continue at block 425; otherwise, the actions continue at block 420. At block 420, a synchronization object is created. For example, referring to FIG. 2, the user interface element 213 or the program 220 may create a synchronization object using an identifier that the other will use to attempt to open the synchronization object.

At block 425, the synchronization object is waited on. For example, referring to FIG. 2, the program may wait for the synchronization object to be signaled.

At block 430, data is loaded into the user interface element. For example, referring to FIG. 2, the user interface element 213 loads data from a database.

At block 435, readiness is indicated via the synchronization object. For example, referring to FIG. 2, the user interface element 213 causes the synchronization object to change states (e.g., be signaled), thus indicating that the user interface element 213 is finished loading its data and is ready to be interacted with.

At block 440, any threads waiting on the synchronization object are awakened. For example, referring to FIG. 2, a thread of the program 220 that was waiting on the synchronization object is awakened.

At block 445, the user interface element is interacted with. For example, referring to FIG. 2, the program 220 sends a command to the user interface element 213 to select a list box item, for example, that was populated from the database.

At block 450, the actions end.

Turning to FIG. 5, at block 505, the actions begin. At block 510, a user interface (UI) element identifier (ID) store is accessed. For example, referring to FIG. 2, the program 220 may access the store 215.

At block 515, the UI element ID is obtained. For example, referring to FIG. 2, the program 220 may obtain a UI element ID from the store 215.

At block 520, a process ID is obtained. For example, referring to FIG. 2, the program 220 may obtain a process ID of the user interface 205.

At block 525, the process ID is combined with the UI element ID to create an identifier to use in creating (or opening) a named event synchronization object. For example, referring to FIG. 2, the program 220 may combine the previously obtained UI element ID with a process ID of the user interface 205.

At block 530, a named event synchronization object is created (or opened if it exists). For example, referring to FIG. 2, the program 220 may create a named event synchronization object using the identifier previously created.

At block 535, the named event synchronization object is waited on. For example, referring to FIG. 2, a thread of the program 220 may wait on the recently created named event synchronization object.

At block 540, interaction with the UI element occurs. For example, referring to FIG. 2, the program 220 may interact with one of the user interface elements after the user interface object has signaled the named event synchronization object.

At block 545, the actions end.

As can be seen from the foregoing detailed description, aspects have been described related to detecting the ready state of a user interface element. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions, which when executed perform actions, comprising:
creating a synchronization object that indicates whether a user interface element is ready to be interacted with;
loading data into the user interface element; and
indicating via the synchronization object that the user interface element is ready to be interacted with.

2. The computer-readable storage medium of claim 1, wherein the user interface element is ready to be interacted with when the user interface element has loaded data associated with the user interface element and is ready to receive input.

3. The computer-readable storage medium of claim 1, further comprising determining whether the synchronization object has already been created.

4. The computer-readable storage medium of claim 1, wherein the synchronization object comprises a named event.

5. The computer-readable storage medium of claim 1, wherein the synchronization object comprises a mutex.

6. The computer-readable storage medium of claim 1, wherein the synchronization object comprises a semaphore.

7. The computer-readable storage medium of claim 1, wherein loading data into the user interface element comprises loading data via a background thread while having a foreground thread of the user interface element available to respond to paint events.

8. The computer-readable storage medium of claim 1, wherein loading data into the user interface element comprises obtaining the data from a database external to a device upon which the user interface element resides.

9. The computer-readable storage medium of claim 1, further comprising awakening a thread that is waiting for the synchronization object to be signaled.

10. The computer-readable storage medium of claim 9, wherein the thread is part of a program designed to test the user interface element.

11. A method implemented at least in part by a computer, the method comprising:
accessing a store including user interface element identifiers associated with user interface elements;
obtaining a user interface element identifier associated with one of the user interface elements;
obtaining a process identifier associated with a process that includes the one of the user interface elements;
combining the process identifier with the user interface element identifier to form an event identifier; and
creating a named event synchronization object with the event identifier.

12. The method of claim 11, wherein the user interface element identifiers are included with executable code that creates the user interface elements when executed.

13. The method of claim 11, wherein the user interface element identifiers are created by a development tool used to create code for a user interface that includes the user interface elements.

14. The method of claim 13, wherein the development tool derives the user interface element identifiers from names given to the user interface elements.

15. The method of claim 11, wherein obtaining a process identifier associated with a process that includes the one of the user interface elements comprises the process obtaining the process identifier.

16. The method of claim 11, wherein obtaining a process identifier associated with a process that includes the one of the user interface elements comprises a testing process causing the process to be executed and obtaining the process identifier.

17. The method of claim 11, further comprising having a thread wait for the named event synchronization object to be signaled before attempting to interact with the one of the user interface elements.

18. In a computing environment, an apparatus, comprising:
a computer comprising a processing unit coupled to a memory, the memory comprising:
a program operable to wait on a synchronization object before interacting with a user interface element;
the user interface element operable to signal the synchronization object when the user interface element is ready; and
a store operable to store an user interface identifier of the user interface element, the user interface identifier being used by the program and the user interface element to identify the synchronization object.

19. The apparatus of claim 18, wherein the program comprises a test program operable to test features of the user interface element.

20. The apparatus of claim 18, wherein the synchronization object comprises a named event synchronization object.

* * * * *